United States Patent [19]
Wilson

[11] 3,935,142
[45] Jan. 27, 1976

[54] SMOKE-RETARDANT POLYVINYLCHLORIDE COMPOSITIONS
[75] Inventor: Alfred P. Wilson, St. Charles Township, Kane County, Ill.
[73] Assignee: Standard Oil Company, Chicago, Ill.
[22] Filed: Feb. 3, 1975
[21] Appl. No.: 546,540

[52] U.S. Cl.. 260/23 XA; 260/45.7 P; 260/45.75 P; 260/45.75 K; 260/42.49
[51] Int. Cl.² ........................................... C08G 6/00
[58] Field of Search.. 260/45.75 P, 45.75 K, 45.7 P, 260/23 XA, 42.49

[56] References Cited
UNITED STATES PATENTS
2,563,772   8/1951   Cheney .................. 260/45.75 P Primary Examiner—V. P. Hoke
Attorney, Agent, or Firm—William C. Clarke; Arthur G. Gilkes; William T. McClain

[57] ABSTRACT

Smoke-retardant polymer compositions comprising a resinous polymer of vinyl chloride polymer and at least a sufficient amount of ferrous trimellitate to reduce smoking.

6 Claims, No Drawings

SMOKE-RETARDANT POLYVINYLCHLORIDE COMPOSITIONS

BACKGROUND OF THE INVENTION

The field of this invention relates to smoke-retardant polymer compositions.

The growing concern about the fire safety of consumer products has resulted in an increased recognition that a large percentage of the fatalities resulting from accidental fires can be traced to causes other than burns; namely smoke, heat, noxious gases and deficiency of oxygen. It has been suggested that at least half of the deaths attributed to fire, except for clothing fires, are caused by smoke rather than heat or actual burning. The need to formulate plastic materials to provide a minimum of smoke hazard in an accidental fire is emphasized by the versatility of plastic materials which has led to their use in every conceivable application.

The aspects of smoke from smoldering or burning materials which render smoke hazardous are that smoke is irritating to the eyes and respiratory system; if dense, smoke can impede escape; smoke is toxic, either directly or because of oxygen reduction; smoke can engender panic; smoke constituents can be detrimental to property. Of these hazards, however, only density of smoke has been commonly measured.

During recent years, emphasis has developed upon methods and compositions which will reduce the smoke and flame characteristics of plastic materials. Smoke is known to be made up of fine particles of carbon in a gaseous mixture of the volatilized products of combustion. The common noxious compounds in combustion gases are carbon monoxide, the oxides of nitrogen, hydrogen cyanide, hydrogen sulfide, acetic acid, acrolein, acetaldehyde, formaldehyde, formic acid and ammonia. Other gases are released, depending upon the material being burned.

Polyvinyl chloride (PVC) compositions are inherently self-extinguishing because of the high chlorine content. But, because of this poor burning characteristic, PVC compositions emit large volumes of dark black smoke when burned. The particulate matter of the smoke are carbon particles and partially burned polymer fragments. The noxious gases are principally hydrogen chloride and carbon monoxide but, in the main, hydrogen chloride. It is known that incorporating a smoke-retardant additive into some PVC compositions produces a significant decrease in smoke density and volume.

The flammability of flexible PVC compositions consisting of vinyl chloride polymer, plasticizer, stabilizer, filler and antioxidant is determined largely by the plasticizers used. Aryl phosphates and chlorinated paraffins can be utilized with other plasticizers to give materials flame resistance. However, low temperature properties such as low temperature flexibility and brittle temperature of the resulting PVC composition are affected. If phthalate plasticizers are required to develop necessary properties in the final composition, other fire retardants such as antimony oxide are often used. However, the presence of a fire retardant such as antimony oxide does not necessarily aid in the retardation of smoke. The incorporation of flame retardants into a polymer composition has been found often to cause the emission of increased quantities of smoke by increasing the tendency to smolder.

The usefulness of a smoke suppressant additive depends upon its ability to suppress smoke and also upon whether it will have adverse effects upon the physical properties of the polymer composition. Preferably, smoke retardant additives for vinyl chloride polymers should be sufficiently active in the presence of flame retardants to cause a measurable decrease in smoke output. The smoke retardant additive should be effective within the range of the combustion temperatures of the PVC polymer composition to convert carbonized polymer particles and noxious gases such as carbon monoxide to carbon dioxide. Additionally, the smoke retardant additive should be sufficiently compatible with all constituents of the PVC polymer composition, i.e. resinous polymers, stabilizers, plasticizers — both primary and secondary, antioxidants, flame retardants, and others, to remain incorporated under conditions of formulation and use. The additive should be sufficiently compatible so that it can be mixed and fused into a coherent, homogeneous material with good stability in that it will not separate easily from the polyvinyl chloride compound when a stress is imposed upon the system such as occurs during extrusion. Chemical stability is an important aspect of compatibility of an additive within the use environment, including conditions of degradation brought about by normal aging. An additive may initially be compatible with a polymer but later exude after a period of use due to degradation of either the additive or the polymer.

Ferrous oxide is known as an oxidative catalyst for carbon monoxide, but ferrous salts of polycarboxylic acids and acid anhydrides have not been known as polymer smoke suppressants. Ferrocene, a coordination compound of ferrous iron and two molecules of cyclopentadiene, has been used as a smoke suppressant additive for vinyl chloride polymers. Ferrocene, however, volatilizes readily at temperatures above 100°C. with a vapor pressure of 2.6 mm Hg at 100°C. Optimum smoke suppressant effect is found at a ferrocene additive level between 0.25 and 0.5%. Unfortunately, various stabilizers are not effective with ferrocene in PVC compositions. Barium-cadminum-zinc phosphite stabilizer systems in PVC compounds can reduce the smoke suppressant effect of the ferrocene additive. Some butyl tin stabilizers when used with ferrocene have been reported to increase smoke in PVC formulations. Ferric smoke suppressants for other polymers are known. Ferric 8-hydroxy-quinolate, as well as the manganese and chromium 8-hydroxyquinolates, has been incorporated into styrene polymers, such as polystyrene, styrene/acrylonitrile copolymers, styrene/butadiene copolymers, styrene/acrylonitrile/butadiene copolymers and other styrene copolymers to reduce smoking.

SUMMARY OF INVENTION

Ferrous trimellitates in compositions of resinous polymers of vinyl chloride of 0.25 to 2.00 parts per hundred (PHR) by weight of polymer, or in sufficient amounts to reduce smoking.

DESCRIPTION OF THE PREFERRED EMBODIMENTS

I have found that the incorporation of ferrous trimellitate into a vinyl chloride polymer composition consisting of vinyl chloride polymer compositions, which contain plasticizers, stabiliziers, fillers, anti-oxidants and/or other substituents results in a polymer composition that upon burning substantially reduces smoke generation and significantly increases the amount of char produced.

For the purpose of this invention the term "resinous polymer of vinyl chloride" includes homopolymers of vinyl chloride, copolymers of vinyl chloride and vinyl acetate, such as the conventional 95-5 vinyl chloride/-vinyl acetate copolymers, partially hydrolyzed vinyl chloride/vinyl acetate copolymers, vinyl acetate/vinyl chloride/alpha, beta-ethylenically unsaturated-alpha, beta-dicarboxylic acid copolymers (such as the butyl half-ester of maleic acid or dioctyl fumarate ester, etc.) etc., wherein at least 50 mole percent of the polymer constitutes vinyl chloride units.

Stabilizers are defined as materials added to a PVC formulation to avoid the evolution of hydrogen chloride and prevent discoloration at the elevated temperatures required to process PVC compounds. At present, the exact mechanism by which stabilizers function is not actually known but practical applications of stabilizers have been developed based upon five general types; amines, organotin compounds, basic lead compounds, metallic salts of phenols and organic (aromatic or aliphatic) acids, and additives such as epoxidized oils, chelating agents, ultra-violet radiation absorbers and antioxidants. Among the commercial stabilizers of commerce, a large class of stabilizers is based on lead compounds but use is limited to opaque plastics and non-food applications. Organotin compounds are used in rigid formulations or where high clarity is required and include the following classes: di-n-alkyl-tin mercaptides, di-n-alkyltin dilaurates, and dibutyltin dimaleate. Aliphatic acid salts of cadmium and barium are particularly suitable for flexible compositions where clarity or translucency and freedom from staining are required. For purposes of this invention, a compatible stabilizer is further defined as one wherein the smoke-retardant additive retains its properties in the PVC composition without substantial impairment of those properties by the stabilizer.

The principal object of this invention is to provide a new smoke-retardant additive which can be used alone or together with other additives in polyvinyl chloride compositions to reduce emission of smoke and promote increased char upon the burning of the PVC composition. Another object of this invention is to provide a smoke-retardant additive for PVC compositions which is compatible with the other constituents of the polymer composition under conditions of formulation and use. Another object of this invention is to provide smoke-retardant properties without undue impairment of critical polymer properties. Other and further objects of the present invention will be apparent from the following detailed description and the given examples.

I have now found that ferrous salts of trimellitic acid are excellent polymer smoke suppressants and can be advantageously employed with a wide variety of conventional PVC stabiliziers, i.,e., lead compounds, organotin compounds, aliphatic acid salts of barium and cadmium. It is theorized that the iron oxides which form upon the combustion of the ferrous trimellitate function as oxidative catalysts at the combustion temperatures to oxidize the carbon soot particles to carbon monoxide and, thence, to carbon dioxide, and to oxidize the carbon monoxide to carbon dioxide. However, the mechanism of reaction in the smoke suppressant reaction is not fully understood. Thus, it is not known whether formation of the iron oxides is a true condition precedent to oxidize the carbon soot particles to carbon monoxide and, thence, to carbon dioxide and the carbon monoxide to carbon dioxide. I therefore, do not wish to be bound by any single theory of reaction mechanism herein.

The usefulness of a smoke suppressant additive will of course depend upon its ability to suppress smoke but also, as with other additives, whether it will have adverse effects upon the physical properties of the polymer composition. The smoke-retardant additives should impart smoke-retardant properties without undue impairment of critical polymer properties such as strength and processibility as well as being sufficiently compatible with the constituents of polymer compositions. The present invention, the ferrous salt of trimellitic acid, demonstrates such required compatibility in typical polymer compositions, remaining incorporated during conditions of formulation and use. Surprisingly, ferrous trimellitate imparts a smoke-retardant effect to vinyl chloride polymers without serious impairment of the properties of the polymer compositions. Ferrous trimellitate is compatible with the commonly-used plasticizers as dioctyl phthalate, the commonly used fillers such as calcium carbonate, with antimony oxide which is a well-known flame retardant, with most of the commonly-used stabilizer systems, as well as pigments such as titanium oxide. For the most part, the compatibility of ferrous trimellitate with any additive can be determined by routine tests. The ferrous salt of trimellitic acid is effective as a smoke retardant for flexible polyvinyl chloride up to 100 parts per hundred (PHR) by weight of incorporated plasticizer. It is also effective as a smoke retardant for most rigid stabilized PVC compositions.

Unpredictably, not all stabilizers are effective with ferrous trimellitate when ferrous trimellitate is used as a smoke retardant. For reasons which are not understood, one proprietary organotin sulfur-containing stabilizer (Thermolite 31 made by the M&T Chemicals, Inc.) is not compatible for use in rigid PVC, whereas a similar organotin mercaptide stabilizer (TM-181 made by Cincinnati Milacron Chemicals, Inc.) is compatible. Methods of manufacturing stabilizers are known to cause subtle differences in resulting characteristics in use. It is apparent that these subtle differences extend to smoke-retardant additives and that the differences in the resulting smoke-retardant characteristics of ferrous trimellitate with differing stabilizers should not operate to diminish the spirit of the described invention.

In the examples that follow, the ferrous trimellitate salt that was used was made as follows. 28.8 Grams of trimellitic anhydride (TMA) were dissolved in 1500 grams of hot (82° to 88°C.) water in a 3000 ml. beaker. The solution was buffered with sodium bicarbonate to a pH of 4 to 5. 98.4 Grams of hydrated ferrous chloride ($FeCl_2.4H_2O$) were added after the TMA had dissolved. The mixture was heated and held within the range of 82°–88°C. for two hours by which time a precipitate had formed. This precipitate was decanted, filtered and air-dried. Yield was approximately 23 grams of ferrous trimellitate. Following the same procedure, trimellitate salts of several bivalent metals as well as trivalent iron were prepared. The bivalent metal salts were those of lead, manganese, cobalt and nickel.

Test samples were made by blending the trimellitate salts with the thermoplastic resins upon a weight basis in terms of parts per hundred of resin (PHR) in typical formulae well-known in the industry.

Additives were blended with the thermoplastic resins by milling at a temperature of 166°C. (a range of 160° to 170°C.) for 5 to 10 minutes. The sheet was removed from the mill, allowed to cool, and test samples were then cut from the sheet. The sheet was several feet long, 14 inches wide and approximately 0.020 inches (0.0508 cm.) in thickness. Test samples for smoke determinations were subsequently cut from this sheet.

Smoke measurement tests were made in an Aminco NBS Smoke Density Chamber. The standard sample size specified for the smoke optical density measurement, per ASTM Special Technical Publication 422 (1969), is 2-15/16 in. × 2-15/16 in. The thickness is dependent upon the material being tested and is not specified in the test procedure.

Triplicate determinations were made. Each sample was exposed to an energy flux of 2.5 watts/cm$^2$ from the radiant heater under flaming conditions. Flames from a multidirectional propane burner impinged upon the sample and into the trough at the bottom of the sample holder during the measurements.

The sample was exposed until a minimum transmittance value was obtained. After the smoke had been flushed from the cabinet, the residual attenuation of the light beam, caused by the window deposits, was recorded and a correction applied to the maximum absorbance value.

Specific optical densities, normalized with respect to unit surface area of the sample (Dm) were calculated. The rate of smoke evolution can be determined from transmittance data, recorded as a function of time.

The specific optical densities are defined by the following expressions:

$$Dm \text{ (corr.)} = \frac{V}{A'L} A \text{ max (corr.)}$$

where

V = test chamber volume
L = optical path length
A' = surface area of the sample
$A_{max \text{ (corr)}}$ = $A_{max} - A_w$
$A_{max \text{ (corr)}}$ - maximum corrected absorbance during the test
$A_{max}$ - maximum measured absorbance during the test
$A_w$ - absorbance caused by deposits on the windows It has been found that smoke generation of polyvinyl chloride compositions can be substantially lessened through the incorporation of a ferrous trimellitate. In terms of quantities used, it has been found that addition of 0.25 to 2.00 PHR upon a weight basis of the resinous polymer of vinyl chloride has been found to be preferable in terms of the formulations used. It should be understood, however, that higher levels of ferrous trimellitate can be desirable with other formulations and the detailed exposition of the application of these materials, while indicating preferred embodiments, are given by way of illustration only since various changes and modifications within the spirit and scope of the invention will become apparent to those skilled in the art from this detailed description.

In order to facilitate a clear understanding of the invention, the smoke-retardant polymer compositions comprising a resinous polymer of a vinyl chloride polymer and at least a sufficient amount of ferrous trimellitate to reduce smoking, the following specific embodiments are described in detail.

EXAMPLE I

Twelve test samples of flexible polyvinyl chloride were made up in a typical formula, well-known in the industry, and which uses lead stabilizers.

|  | PHR |
|---|---|
| Polyvinyl Chloride Resin (Geon 103EP-F76) | 100 |
| Dioctyl Phthalate | 55 |
| Calcium Carbonate | 7 |
| Tribase E (Lead Stabilizer-NL1, Inc.) | 0.5 |
| DS207 (Lead Stearate-NL1, Inc.) | 1.0 |
| Titanium Oxide | 1.0 |
| Oncor 75RA (Antimony Oxide-NL1, Inc.) | 1.0 |
| Smoke Suppressant (Trimellitate Salt) | 1.0 |
| Total | 166.5 |

Trimellitate salts of trivalent iron and bivalent iron and barium were added on the smoke suppressants. Flaming tests were conducted in an Aminco-NBS Smoke Density Chamber according to the procedures given in ASTM Special Technical Publication 422 (1969). The specific optical density, normalized with respect to the unit surface area of the sample, DM (corr), was calculated, corrected for window deposits.

The effectiveness of the ferrous salt with lead stabilizers was demonstrated. A significant decrease in the specific optical density of the ferrous salt composition was shown. The ferric and barium salt compositions did not demonstrate decreased specific optical density. The data are presented in Table I.

Table I

| Optical Density Data For Flexible PVC Compositions Containing TMA Smoke Retardants | | | | |
|---|---|---|---|---|
| TMA Salt | Dm (Corr) | | | |
|  | 1 | 2 | 3 | Avg |
| Control (No Retardant) | 207 | 234 | 227 | 223 |
| Ferrous | 110 | 152 | 113 | 125 |
| Ferric | 291 | 315 | 347 | 318 |
| Barium | 284 | 235 | 221 | 247 |

EXAMPLE II

Twelve test samples of rigid polyvinyl chloride were made up in a typical formulation well-known in the industry, which uses a proprietary tin stabilizer made by M & T Corporation.

|  | PHR |
|---|---|
| Polyvinyl Chloride Resin (Ethyl 185) | 100.0 |
| T31 (Tin Stabilizer-M & T Corp.) | 2.0 |
| 90T (Calcium Carbonate) | 2.0 |
| Calcium Stearate | 0.6 |
| Wax XL 165 (American Hoechst) | 1.0 |
| Titanium Oxide | 2.0 |
| Smoke Suppressant (Trimellitate Salt) | 1.0 |
| Total | 108.6 |

Trimellitate salts of trivalent iron and bivalent iron and barium were added as the smoke suppressants. Flaming tests were conducted as in Example I, in an Aminco-NBS Smoke Density Chamber according to the procedures given in ASTM Special Technical Publication 422 (1969). The specific optical density, normalized with respect to the unit surface area of the sample, DM (corr), was calculated, corrected for window deposits.

The ineffectiveness of the trimellitate salts to reduce smoke in a tin stabilizer-PVC formulation using the above proprietary tin stabilizer of M & T Corporation was well demonstrated. Addition of the trimellitate salt did not result in decreased specific optical density in the Aminco-NBS test, as might have been expected, thus demonstrating the unpredictability and unobviousness of the invention. The data are presented in Table II. It is noted that contrary results with a different proprietary tin stabilizer are reported in Example IV.

TABLE II

Optical Density Data For Rigid PVC Compositions Containing TMA Smoke Retardants

| TMA Salt | Dm (corr) | | | |
|---|---|---|---|---|
| | 1 | 2 | 3 | Avg |
| Control (No Retardant) | 386 | 381 | 505 | 424 |
| Ferrous | 513 | 523 | 480 | 505 |
| Ferric | 528 | 483 | 469 | 493 |
| Barium | 442 | 391 | 369 | 401 |

EXAMPLE III

Twenty-four test samples of flexible polyvinyl chloride were made up in a typical formulation, well-known in the industry, which used lead stabilizers.

| | PHR |
|---|---|
| Polyvinyl Chloride Resin (Geon 103EP-F76) | 100 |
| Dioctyl Phthalate | 55 |
| Calcium Carbonate | 7 |
| Tribase E (Lead Stabilizer-NLI, Inc.) | 1 |
| DS207 (Lead Stearate-NLI, Inc.) | 0.5 |
| RA41 (Titanium Oxide-NLI, Inc. | 1 |
| Oncor 75 RA (Antimony Oxide-NLI, Inc.) | 3 |
| Smoke Suppressant (Lead, Manganese, Cobalt, Nickel, Iron Salts of TMA) | 0.5–1.0 |
| Total | 168.0–168.5 |

Trimellitate salts of bivalent lead, manganese, cobalt, nickel and iron were added as the smoke suppressants. Flaming tests were conducted in an Aminco-NBS Smoke Density Chamber according to the procedures given in ASTM Special Technical Publication 422 (1969). The specific optical density (corrected), DM (corr), was determined.

The ineffectiveness of the bivalent metal salts, other than the bivalent iron salt, in a lead stabilizer-PVC formulation, was demonstrated, again demonstrating the unpredictability and unobviousness of the invention. The bivalent iron salt reduced specific optical density (corrected) even at a level as low as 0.5 PHR. The data are presented in Table III.

Table III

Optical Density Data For Flexible PVC Composition Containing TMA Smoke Retardants

| TMA Salt | Dm (corr) | | | |
|---|---|---|---|---|
| | 1 | 2 | 3 | Avg |
| Control (No Retardant) | 257 | 235 | 214 | 235 |
| Lead | 256 | 236 | 251 | 248 |
| Manganese | 300 | 286 | 302 | 296 |
| Cobalt | 293 | 284 | 243 | 273 |
| Nickel | 296 | 255 | 285 | 279 |
| Ferrous (0.5 PHR) | 211 | 241 | 204 | 219 |
| Ferrous (0.1 PHR) | 194 | 202 | 230 | 209 |
| Ferrous (1.5 PHR) | 210 | 224 | 198 | 211 |

EXAMPLE IV

Nine test samples of rigid polyvinyl chloride were made up in a typical formulation well-known in the industry, which uses a proprietary tin stabilizer supplied by Cincinnati Milacron Chemicals, Inc.

| | PHR |
|---|---|
| Polyvinyl Chloride Resin (Ethyl 185) | 100.0 |
| TM 181 (Tin Stabilizer-Cin. Milacron) | 2.0 |
| 90 T (Calcium Carbonate) | 2.0 |
| Calcium Stearate | 0.6 |
| Wax XL 165 (American Hoechst) | 1.0 |
| Titanium Oxide | 2.0 |
| Smoke Suppressant (Trimellitate Salt) | 0.5–1.0 |

The change of one ingredient in the PVC composition, from one proprietary tin stabilizer as in Example II to another supplied by a separate supplier, influenced the specific optical density (corrected) in tests conducted as in the previous examples. Despite the results shown in Example II, which indicated trimellitate ferrous salts had little or no influence on the Dm (corr) of the rigid PVC, the effectiveness of incorporating a TMA salt with the specified tin stabilizer is apparent in the data presented in Table IV.

Table IV

Optical Density Data For Rigid PVC Composition Containing TMA Smoke Retardants

| TMA Salt | Dm (corr) | | | |
|---|---|---|---|---|
| | 1 | 2 | 3 | Avg |
| Control (No Retardant) | — | — | 224 | 224 |
| Ferrous (0.5 PHR) | 173 | 156 | 162 | 164 |
| Ferrous (1.0 PHR) | 160 | 150 | 145 | 152 |

EXAMPLE V

Separate tests were made to determine the efficacy of ferrous trimellitate salts in PVC compositions containing antimony oxide. Twenty-one test samples were made up in a typical formulation well-known in the industry, which uses a proprietary antimony oxide coated silica, calculated as 25% antimony oxide. Nine test samples of the formulation were evaluated with bivalent lead, manganese, and cobalt TMA salts as smoke suppressants. A second set of twelve test samples of the same formulation with bivalent iron TMA salts (but without the antimony oxide) were made up. The formula was

| | PHR |
|---|---|
| Polyvinyl Chloride Resin (Geon 102) | 100 |
| Dioctyl Phthalate | 50 |
| Mark M (Barium-Cadmium Stabilizer-Argus Chemical Co.) | 3.0 |
| Mark C (Phosphite Chelator-Argus Chemical Co.) | 0.3 |
| Stearic Acid | 0.5 |
| Oncor 75RA (Antimony Oxide-NLI, Inc.) | 0.0–2.0 |
| Smoke Suppressant (Lead, Manganese, Cobalt, Iron Salts of TMA) | 0.5–2.0 |

The presence or absence of antimony oxide in the formulation did not affect the smoke deterrent properties of the bivalent metal TMA salts. The incorporation of the ferrous TMA salt assisted in diminishing the specific optical density (corrected) with or without antimony oxide being present. The incorporation of the other bivalent metal TMA salts did not assist in reducing the DM (corr). Table V indicates the Dm (corr.)

obtained in the presence of antimony oxide. Table VI contains the data on the Aminco-NBS tests without the antimony oxide.

Table V

Optical Density Data For Flexible PVC Composition Containing Antimony Oxide and TMA Smoke Retardants

| TMA Salt | 1 | 2 | 3 | Avg |
|---|---|---|---|---|
| Control (No Retardant) | 262 | 268 | 253 | 261 |
| Ferrous (0.5 PHR) | 190 | 229 | 211 | 210 |
| Ferrous (1.0 PHR) | 203 | 220 | 208 | 210 |
| Ferrous (2.0 PHR) | 228 | 207 | 220 | 218 |
| Lead (2.0 PHR) | 228 | 265 | 277 | 257 |
| Manganese (2.0 PHR) | 337 | 328 | 298 | 321 |
| Cobalt (2.0 PHR) | 269 | 265 | 268 | 267 |

Table VI

Optical Density Data For Flexible PVC Compositions Containing TMA Smoke Retardants Without Antimony Oxide

| TMA Salt | Dm (corr) | | | |
|---|---|---|---|---|
|  | 1 | 2 | 3 | Avg |
| Control (No Retardant) | 247 | 268 | 247 | 254 |
| Ferrous (0.5 PHR) | 222 | 185 | 197 | 201 |
| Ferrous (1.0 PHR) | 220 | 199 | 188 | 202 |
| Ferrous (2.0 PHR) | 204 | 216 | 212 | 211 |

Although the invention has been described in terms of specific embodiments which are set forth in considerable detail, it should be understood that this is by way of illustration only and that the invention is not necessarily limited thereto since alternative embodiments will become apparent to those skilled in the art in view of the disclosure. For example, other stabilizers than the commonly-used ones, i.e., of lead, tin, and barium-cadmium, may be utilized, such as zinc-containing versions of the barium-cadmium stabilizers. Other lubricants than calcium stearate may be used, as well as fillers other than calcium carbonate. Accordingly, modifications are contemplated which can be made without departing from the spirit of the described invention.

I claim:

1. A composition comprising a resinous polymer of vinyl chloride and a smoke-retardant concentration of ferrous trimellitate.

2. The composition of claim 1 wherein said ferrous trimellitate comprises from 0.25 to 2.00 parts by weight per 100 parts by weight resinous polymer of vinyl chloride.

3. The composition of claim 2 wherein said composition comprises a lead stabilizer.

4. The composition of claim 2 wherein said composition comprises a compatible organotin stabilizer.

5. The composition of claim 2 wherein said composition comprises a barium-cadmium stabilizer.

6. Any composition as herein described with particular reference to the examples.

* * * * *

UNITED STATES PATENT OFFICE
CERTIFICATE OF CORRECTION

PATENT NO. : 3,935,142
DATED : January 27, 1976
INVENTOR(S) : Alfred P. Wilson

It is certified that error appears in the above-identified patent and that said Letters Patent are hereby corrected as shown below:

Col. 6, line 19, "added on" should read -- added as -- per application page 10, line 8.

Col. 2, line 42, "-cadminum-" should read -- -cadmium- -- per application page 3, line 26.

Col. 8, line 62, "deterent" should read -- deterrent -- per application page 14, line 24.

Signed and Sealed this

Twentieth Day of July 1976

[SEAL]

Attest:

RUTH C. MASON
*Attesting Officer*

C. MARSHALL DANN
*Commissioner of Patents and Trademarks*